United States Patent
Tsushima et al.

[11] Patent Number: 6,048,414
[45] Date of Patent: Apr. 11, 2000

[54] ROLLING BEARINGS AND METHODS OF PRODUCING THE SAME

[75] Inventors: Noriyuki Tsushima; Yasuhiro Yamamoto, both of Kuwana, Japan

[73] Assignee: NTN Corporation, Osaka, Japan

[21] Appl. No.: 08/896,417

[22] Filed: Jul. 18, 1997

[30] Foreign Application Priority Data

Jul. 19, 1996 [JP] Japan .................................. 8-191233

[51] Int. Cl.$^7$ .............................. C21D 9/40; C22C 38/18
[52] U.S. Cl. .......................... 148/333; 148/906; 148/663
[58] Field of Search .................................. 148/333, 906, 148/663

[56] References Cited

U.S. PATENT DOCUMENTS 3,682,519  8/1972  Shepelyakovsky et al. ............ 308/212

FOREIGN PATENT DOCUMENTS 61-279620  12/1989  Japan .
4-337023   11/1992  Japan .
4-337024   11/1992  Japan .

*Primary Examiner*—Deborah Yee
*Attorney, Agent, or Firm*—Fish & Richardson P.C.

[57] ABSTRACT

The present invention is directed to rolling type bearings having an enhanced resistance to acoustic performance degradation that are best suited for incorporation into information systems as well as methods of producing such rolling type bearings. The resistance to acoustic performance degradation is achieved by improving the microstructure of bearing steel to make it possible to prevent the formation of indentations which can result from prolonged exposure to high-temperature conditions, dropping or other impact loads. A rolling type bearing of the invention comprises outer and inner rings and rolling elements disposed therebetween, at least the outer and inner rings being made of a steel material whose microstructure consists essentially of a mixture of ferrite and cementite. The microstructure consisting essentially of the mixture of ferrite and cementite is produced by quenching or carbonitriding the steel material, and tempering it at a temperature higher than a third stage tempering temperature for steels.

5 Claims, 4 Drawing Sheets

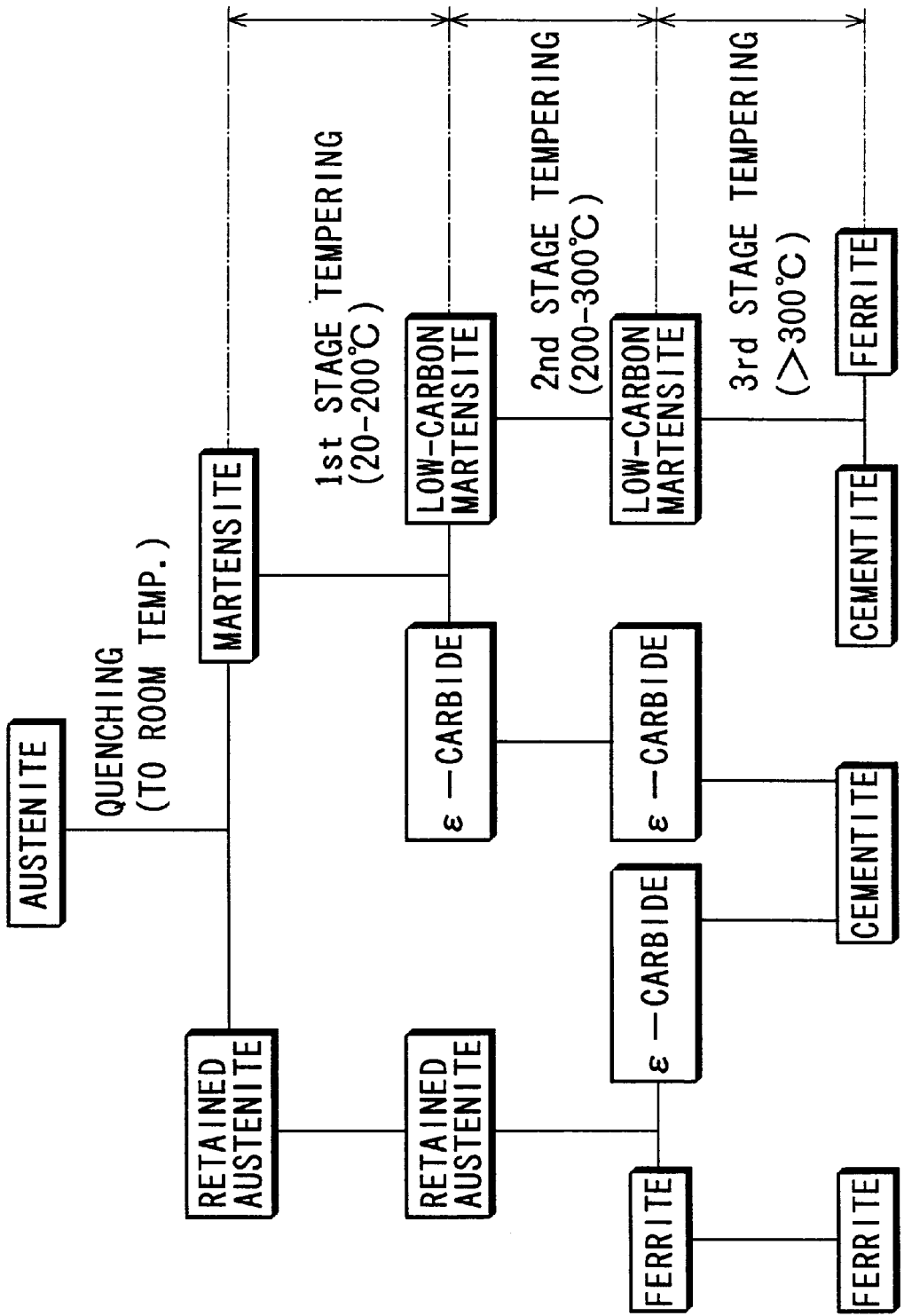

(×5,000)

(×5,000)

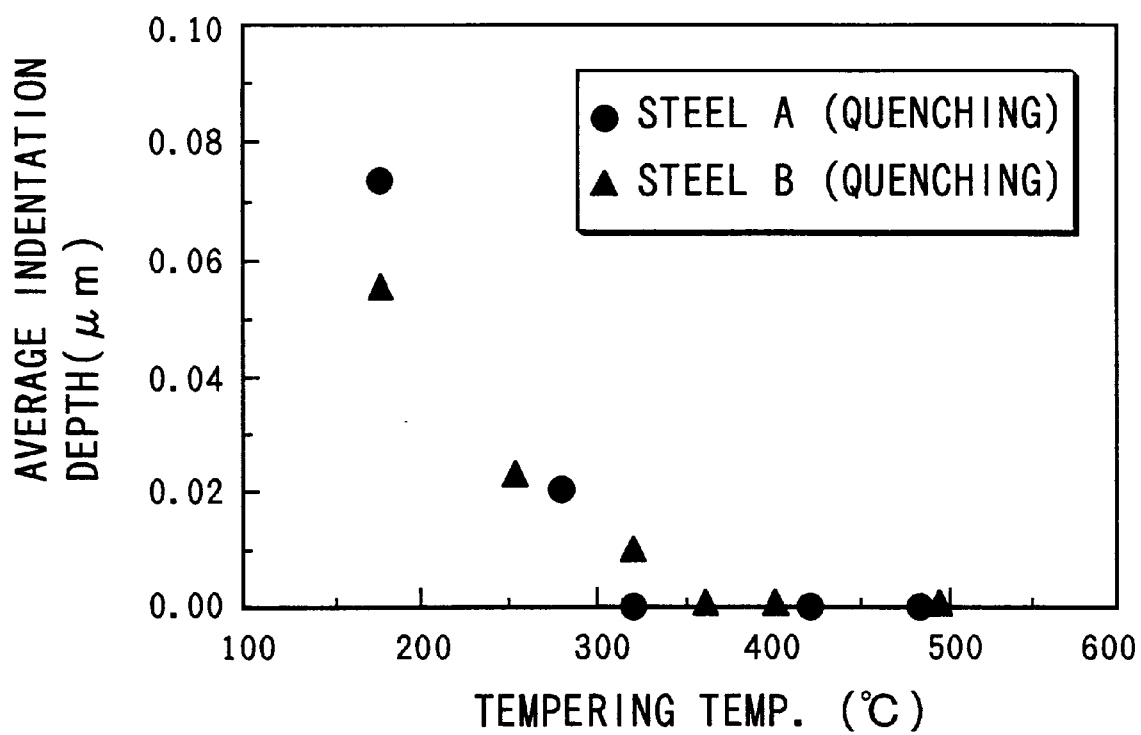

ROLLING BEARINGS AND METHODS OF PRODUCING THE SAME

BACKGROUND OF THE INVENTION AND RELATED ART STATEMENT

The present invention relates to rolling bearings suitable for supporting rotating spindles used in devices for information systems, such as a hard disk drive, and to methods of producing these rolling bearings. More particularly, the invention relates to rolling bearings capable of efficiently preventing vibrations and acoustic noise generation as well as to methods of producing such rolling bearings.

Bearings used in a driving motor for a hard disk drive which serves as a magnetic storage medium in information systems and those used in a driving motor for a polygon mirror of a laser printer, for example, have a compact structure and are operated under relatively light loads. In these applications, it is required that vibrations and acoustic noise produced by the bearings themselves when a spindle supported by the bearings is rotated at a high speed be maintained to the lowest possible level. A conventional technique used for meeting this requirement is to achieve desired levels of surface hardness by quenching and tempering bearing steels and surface finish.

There is a growing tendency to smaller information systems in recent years. With the proliferation of transportable and portable information systems, they are used under ever diversified environmental conditions. Consequently, bearings built in these systems are often operated after they have been left in a non-operating condition for a long period of time in high-temperature environments of 50° C. or above. When left at such high ambient temperatures, the bearings tend to produce significantly increased levels of mechanical and acoustic vibrations. The transportable and portable information systems could be accidentally dropped or caused to hit against a nearby object during transportation. This kind of mechanical shocks can cause the bearings to generate high-level acoustic noise in later use. The useful life of a bearing incorporated in the information systems and other precision machinery and equipment terminates when acoustic noise from the bearing exceeds the tolerable level of operating personnel, rather than when the rolling contact fatigue life of the bearing expires. It is therefore essential to take improvement measures to prevent degradation in acoustic performance of the bearing.

The most likely cause of acoustic performance degradation is a phenomenon which will be described below. If a bearing is left in a non-operating condition for such a long time as 100 hours at high temperatures ranging from 60° C. to 90° C., for example, stresses concentrated on contact surfaces between rolling elements (e.g., steel balls) and inner and outer rings will create as many concave indentations as the number of the rolling elements in the rolling contact surfaces of the bearing rings, even though these indentations are extremely shallow. It is supposed that acoustic vibrations occur when the bearing is operated in this condition, because the rolling elements roll over the successive indentations in a synchronized sequence. Similar concave indentations can also be created on the rolling contact surfaces of the inner and outer rings which are kept in contact with the rolling elements when equipment containing the bearing is dropped or hit against a surrounding object. This can also cause degradation in the acoustic performance of the bearing.

The indentations which can result in degradation in the acoustic performance of the bearing are created by the stresses concentrated at contact points between the individual bearing rings and rolling elements as stated above. The amount of stress concentrated at each contact point is usually half or less the stress level corresponding to the elastic limit of steel elements of the bearing and, therefore, no indentations are supposed to be formed from a theoretical point of view. An impact force that acts on a bearing when equipment containing it is caused to hit against an object is not so severe, as it is no more than one-third the static load carrying capacity of the bearing. However, extremely small-sized indentations formed by such a low level of stress can cause degradation in the acoustic performance of the bearing used in high-precision information systems, although such a low-level stress is likely to be considered negligible in most cases.

A technique used for achieving desired hardness and impact resistance in conventional rolling type bearings involves quenching of bearing steels and tempering at a relatively low temperature of 200° C. or less, in which a certain amount of retained austenite remaining after the quenching process is left as it is. It is, however, recognized today that a steel product whose retained austenite content has been reduced to 0% in second stage tempering is less prone to the formation of indentations due to plastic deformation and is best suited as a bearing material for high-precision equipment, when compared to the conventional bearing steels containing a small amount of retained austenite ("Transactions ASME J. Basic Engineering" June (1960), p. 302; "Bearing" vol. 25 (1983), p. 23). Another known technique employed in a recently developed bearing for preventing its acoustic performance degradation is to reduce the retained austenite content down to 6% by volume or less (e.g., Japanese Unexamined Patent Publication No. 7-103241).

However, even with the technique disclosed in the aforementioned Japanese Unexamined Patent Publication No. 7-103241, concentrated stresses between rolling elements (e.g., steel balls) and rolling contact surfaces of bearing rings that occur when the bearing is kept in a high-temperature environment ranging from 60° C. to 90° C. will cause gradual decomposition of unstable retained austenite. This will result in permanent deformation, or indentations, left in the rolling contact surfaces at their points of contact with the rolling elements. It is quite likely that small-sized indentations are created by an impact force acting on contact points between the rolling elements and the rolling contact surfaces of the bearing rings, because of the elastic limit of the retained austenite being lower than that of martensite. It can be expected from the foregoing that a reduction in the amount of retained austenite is one of effective approaches to preventing the above-described undesirable phenomenon. Even with the aforementioned techniques, however, it is not possible to satisfactorily prevent acoustic performance degradation resulting from the formation of indentations caused by concentrated stresses.

SUMMARY OF THE INVENTION

The present invention has been made in the light of the aforementioned problems. Accordingly, it is an object of the invention to provide rolling bearings having an excellent resistance to acoustic performance degradation that are best suited for use in information systems and other precision equipment as well as methods of producing such rolling type bearings. To achieve this object, the microstructure of steel used in at least inner and outer rings of a bearing is improved from a newly developed point of view, whereby the formation of indentations which will occur when the bearing is left in a high-temperature environment for a long time, or dropped or otherwise subjected to impact loads, is prevented.

A rolling bearing of the invention intended to overcome the aforementioned problems of the prior art comprises outer and inner rings and rolling elements disposed therebetween. A principal feature of the invention is that at least the outer and inner rings of the bearing is made of a steel material whose microstructure consists essentially of a mixture of ferrite and cementite.

In one preferred form of the invention, the steel material used in the bearing is high-carbon chromium bearing steel.

The microstructure consisting essentially of the mixture of ferrite and cementite can be produced by quenching the steel material and tempering it at a temperature higher than a third stage tempering temperature for steels. In this production method of the invention, it is also effective for further improving the performance of the rolling type bearing to increase the surface hardness of the steel material to a Rockwell hardness number (HRC) of 56 or above after obtaining the aforesaid microstructure.

The rolling type bearing of the invention constructed as summarized above is characterized in that the steel material used at least in the outer and inner rings is transformed into a mixed structure of ferrite and cementite. This treatment makes it possible to produce rolling bearings which are best suited for incorporation into information systems susceptible to acoustic vibrations, featuring an excellent resistance to acoustic performance degradation that can result from prolonged exposure to high-temperature conditions or impact loads.

These and other objects, features and advantages of the invention will become more apparent upon reading the following detailed description in conjunction with the accompanying drawings.

BRIEF DESCRIPTION OF THE DRAWINGS

FIG. 1 is a flowchart showing successive steps of a tempering process and microstructural transformations through the process;

FIG. 4 is a graph showing a relationship between tempering temperatures and the depth of indentations formed when each ring-shaped flat plate prepared as a test specimen was maintained stationary for 120 hours at 90° C. with a steel ball pressed against a plate surface.

DETAILED DESCRIPTION OF THE PREFERRED EMBODIMENTS OF THE INVENTION

Figure 2A:
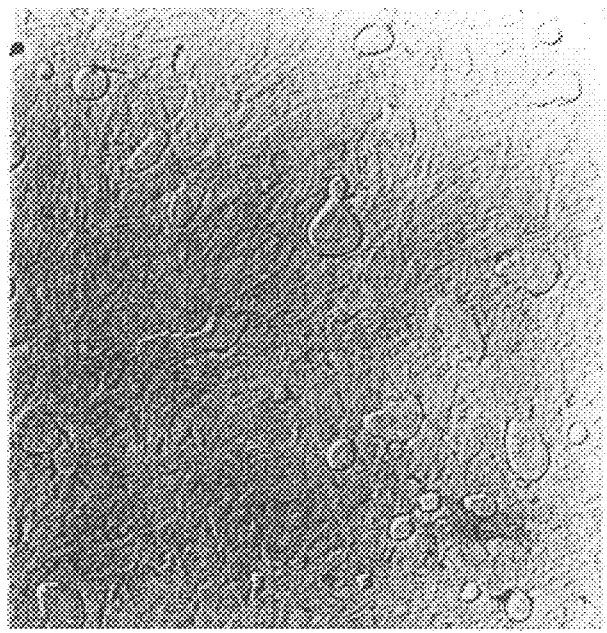
FIGS. 2A and 2B are electron micrographs showing microstructures obtained when steel is tempered at 180° C. and 250° C., respectively.

The inventors carried out an intensive study to find out a method of increasing the resistance to acoustic performance degradation of rolling bearings by taking a completely different approach from the conventional ones which have been described earlier. As a result of this study, the inventors have discovered that the aforementioned object can be fully accomplished with a rolling type bearing comprising inner and outer rings and rolling elements held between the inner and outer rings if at least its rings (inner and outer) are made of steel having a microstructure consisting essentially of a mixture of ferrite and cementite, the microstructure being substantially free of martensite.

A steel product of the invention has the microstructure containing ferrite and cementite as stated above. This microstructure is obtained by tempering an already quenched steel product at a temperature higher than a third stage tempering temperature, as will be described later with reference to FIG. 1. If the previously quenched steel product is tempered at a temperature higher than the third stage tempering temperature, a resultant microstructure will contain residual cementite (also known as spheroidal cementite) that exists immediately after quenching, a mixture of ferrite formed when quenched martensite is decomposed during tempering and fine-grained cementite (this mixed structure is known as tempered troostite), and a mixture of ferrite formed when retained austenite existing after quenching is decomposed during tempering and fine-grained cementite. To summarize, the microstructure of the steel product of the invention is a mixture of three phases containing spheroidal cementite, ferrite and fine-grained cementite (substantially a two-phase structure composed of ferrite and cementite), ferrite constituting a major part of the microstructure.

According to this invention, the microstructure of the steel product is transformed into the two-phase structure of ferrite and cementite by tempering it at a temperature higher than the third stage tempering temperature. This transformation process will now be described in detail with reference to the accompanying drawings.

FIG. 1 is a flowchart showing a sequence of steps of a tempering process. At a second stage tempering, the steel product has a microstructure containing a mixture of ferrite formed when residual austenite is decomposed and $\epsilon$-carbide, and a mixture of low-carbon martensite formed when quenched martensite is decomposed and $\epsilon$-carbide. Although the aforementioned residual cementite usually exists in addition to these mixtures at the second stage tempering, FIG. 1 shows a structure free of any residual cementite obtained by using an increased quenching temperature. It is shown in FIG. 1 that the structure obtained at the end of second stage tempering has a three-phase structure containing ferrite, $\epsilon$-carbide and low-carbon martensite.

Martensite existing within the microstructure formed by quenching is decomposed during high-temperature tempering performed in a temperature range above the third stage tempering temperature, forming a mixed structure containing ferrite and cementite which has a further stabilized nature. Although hardness testing of this mixed structure reveals its softened composition, structural stabilization is supposed to offer an increased resistance to plastic deformation caused by a considerably low stress in a case where an extremely small amount of plastic deformation is a matter of critical importance.

A fundamental difference between the low-carbon martensite produced during second stage tempering and the ferrite produced during third stage tempering lies in their solid solution carbon content. More particularly, the low-carbon martensite can contain approximately 0.3% of solid solution carbon while the ferrite can contain only 0.002% or less of solid solution carbon. The difference in solid solution carbon content results in a difference in lattice constants. Specifically, the low-carbon martensite forms a tetragonal crystal while the ferrite constitutes a stable cubic crystal. It will be recognized that the more stable a crystalline structure, the smaller the lattice defect of a crystal and the less significant the minor plastic deformation caused by low-level stresses. This means that the plastic deformation due to prolonged exposure to high temperature conditions or impact loads is less likely to occur in a crystalline structure which has become extremely stable at the end of third stage tempering. Steel product always contains $\epsilon$-carbide at the end of second stage tempering, while this $\epsilon$-carbide is transformed into cementite during third stage tempering.

A careful study undertaken by the inventors indicates that particles of ε-carbide that precipitate during second stage tempering are 1000 Å or less in diameter and, thus, it is difficult to observe their structure at a magnification of about 5000×. In contrast, particles of cementite deposited as a result of tempering at a temperature higher than the third stage tempering temperature have such physical sizes (e.g., 0.1 micrometers in diameter) that can be clearly observed by using an electron microscope. The uniformly dispersed particles of cementite having such fine but specific grain sizes are considered to be a factor contributing to the prevention of plastic deformation under light load conditions.

Figure 2B:
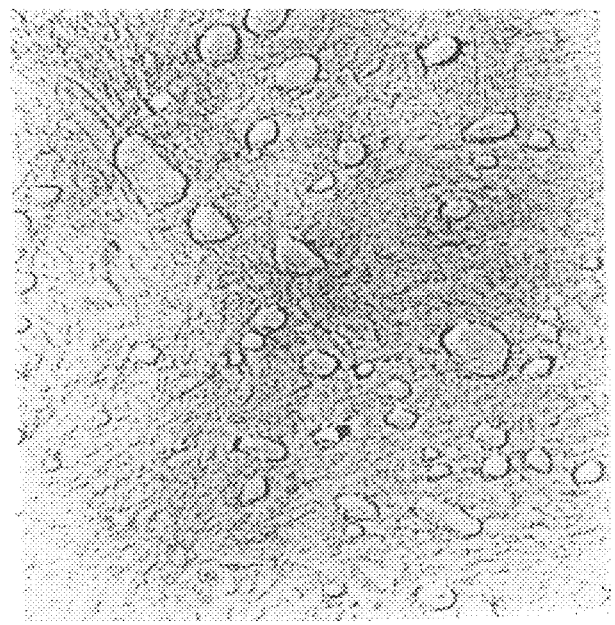
Figure 3A:
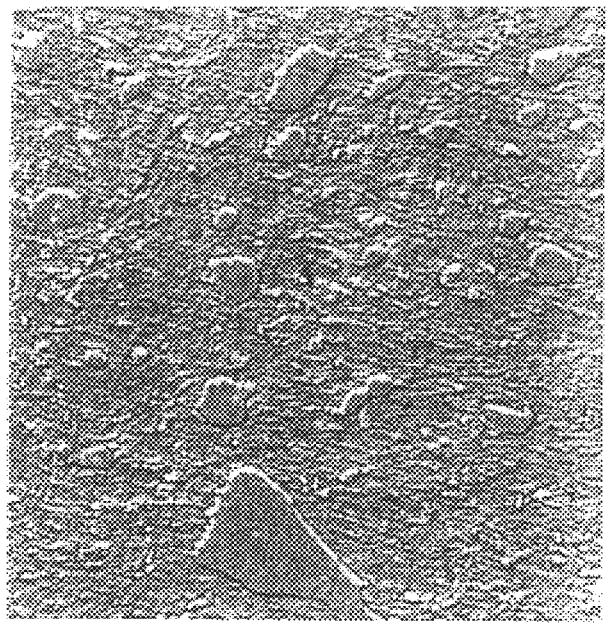
FIGS. 3A and 3B are electron micrographs showing microstructures obtained when steel is tempered at 300° C. and 350° C., respectively.
Figure 3B:
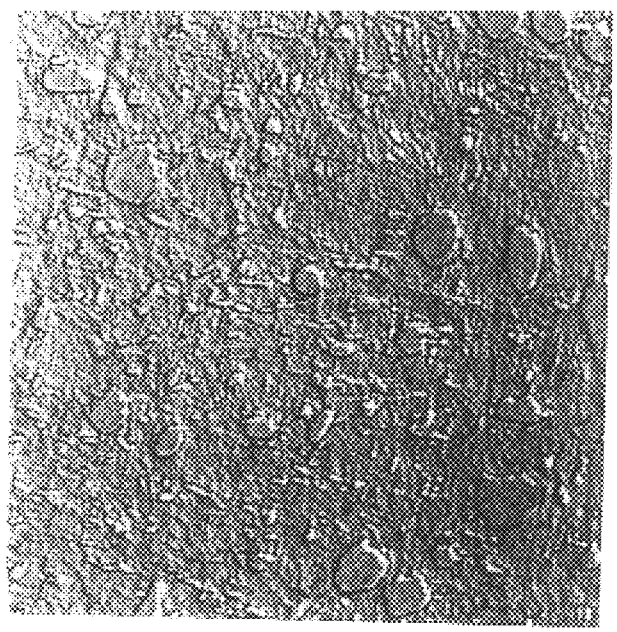

FIGS. 2A–2B and 3A–3B are electron micrographs showing the aforementioned differences in microstructures of steel products. Specifically, FIGS. 2A and 2B show microstructures obtained when steel is tempered at 180° C. and 250° C., respectively. FIGS. 3A and 3B present microstructures obtained when steel is tempered at 300° C. and 350° C., respectively. Examination of these electron micrographs indicates that no precipitation of fine-grained cementite is observed in steel which has almost gone through second stage tempering at 250° C., as is the case with steel tempered at 180° C. In contrast, precipitation of fine-grained cementite is evident in steel tempered at 300° C., individual particles of cementite having thin spinelike shapes measuring approximately 0.2 micrometers long on average. A steel product obtained by third stage tempering at 350° C. shows signs of growth of fine-grained cementite.

In the above-described production method of the invention, it is also effective for further improving the performance of a rolling type bearing to increase the surface hardness of a steel product to a Rockwell hardness number (HRC) of 56 or above through a mechanical hardening treatment after obtaining the microstructure composed of ferrite and cementite. Shot peening and rolling are examples of such mechanical hardening treatment suitable for this purpose. For example, the surface hardness of bearing steel type SUJ2 slightly decreases if it is tempered at a temperature exceeding the third stage tempering temperature. If its surface hardness is lower than HRC 56, its surface becomes susceptible to surface flaws. Consequently, bearing elements made from this bearing steel could be damaged during a grinding process, and this can cause high-level initial noise generation from a finished bearing that contains the bearing elements. Furthermore, intrusion of a foreign material into the bearing could cause surface damages when it is operated, resulting in an increase in acoustic noise. An increase in the surface hardness of the bearing elements to HRC 56 or above is therefore quite effective for preventing such inconvenience. Another effective approach is to retemper the steel product at a temperature of 200° C. or less for eliminating unevenness in residual stress distribution after a surface treatment process.

The production method of the invention may employ in its quench hardening process either ordinary quenching or carburizing. Another alternative treatment is a carbonitriding process which creates a nitrogen-rich structure immediately beneath the surface of the steel product. It is possible to achieve a surface hardness of HRC 58 or above even at the end of third stage tempering by increasing the density of nitrogen immediately beneath the surface in this manner. This approach serves to increase the resistance of the bearing to its acoustic performance degradation and to prolong its rolling contact fatigue life.

While the aforesaid object of the invention is achieved if a steel product complying with the above-described requirements is used at least in the inner and outer rings of the bearing, extra advantages will be obtained if a steel product complying with the same requirements is used in the rolling elements as well. This makes it possible to prevent the formation of indentations in the surface of each rolling element and further increase the resistance of the bearing to its acoustic performance degradation. Another effective approach would be to employ rolling elements made of a ceramic material instead of the steel elements. The ceramic rolling elements are almost unlikely to develop indentations due to contact with the bearing rings even when the rolling type bearing is left in a high-temperature environment for an extended period of time, and the use of ceramics results in an increase in wear resistance. Ceramic materials commonly used in conventional rolling type bearings can be employed in the rolling type bearings of the invention. These include silicon nitride, silicon carbide, alumina and zirconia, for example.

A typical type of steel that can be used in this invention is high-carbon chromiumbearing steel (e.g., SUJ1–SUJ3 as defined in a Japanese Industrial Standard).

Specific examples of steel products according to the invention are now described in greater detail. It is to be recognized, however, that the invention is not limited to these examples but may be modified or altered in specific details within the spirit and scope of the invention.

EXAMPLES

The inventors prepared two ring-shaped flat plates as test specimens, one made of an ordinary steel (hereinafter referred to as steel A) equivalent to SUJ2 steel, and the other made of a steel (hereinafter referred to as steel B) equivalent to SUJ2 steel except that its silicon content is increased to 1.0%. These ring-shaped flat plates were subjected to an indentation forming test, in which each plate was maintained stationary in a heated condition with a still ball pressed against a plate surface and the depth of indentation formed, if any, was measured after removing the still ball. Table 1 below shows chemical compositions of the two specimens; steel A and steel B.

TABLE 1

| Steel type | Chemical composition (mass %) | | | | | | | Remarks |
|---|---|---|---|---|---|---|---|---|
| | C | Si | Mn | P | S | Cr | Al | |
| Steel A | 1.00 | 0.25 | 0.45 | 0.010 | 0.010 | 1.45 | 0.029 | Equivalent to SUJ2 |
| Steel B | 1.00 | 1.00 | 0.43 | 0.010 | 0.008 | 1.46 | 0.030 | SUJ2 with high silicon content |

Each of the ring-shaped flat plates was produced by making a hole measuring 15 mm in diameter at the middle of a disc which measured 28 mm in diameter and 2.5 mm thick. Each ring-shaped flat plate was heated to and kept at a temperature of 850° C. for 30 minutes, oil-quenched, and subjected to 120-minute tempering in a temperature range of 180° C. to 500° C. Each ring-shaped flat plate was eventually subjected to a precision polishing process. The amount of austenite contained immediately beneath the surface of each specimen thus produced was measured by using the X-ray diffraction method. Each ring-shaped flat plate was maintained at a temperature of 90° C. for a period of 120 hours with a still ball (made of SUJ2 steel, 3/16 inch in diameter) pressed against the plate surface at a maximum contact pressure of 1.6 GPa.

FIG. 4 shows the results of the 120-hour indentation forming test at 90° C. It is obviously seen from FIG. 4 that the higher the tempering temperature, the smaller the average depth of indentations formed in the ring-shaped flat plates. Especially when tempered at temperatures of 300° C. and above, the depth of indentations is substantially 0 micrometers regardless of which type of steel (A or B) is used. It has been recognized, based also on the foregoing discussion of tempering process shown in FIG. 1, that steel products tempered at 300° C. or above have a mixed structure of ferrite and cementite.

It is understood from the foregoing that it becomes possible to prevent the formation of indentations if a thermally stable structure consisting essentially of ferrite and cementite is created by tempering previously quenched steel at a temperature higher than the third stage tempering temperature as described above.

The inventors further performed acoustic noise tests of bearings to evaluate the severity of their acoustic performance degradation before and after they were heated. The bearings to be tested, each comprising inner and outer rings above-described measuring method. The ratio of the vibrating speed Vh measured after the 120-hour storage at 90° C. to the vibrating speed Vc measured before the same is used to represent the amount of acoustic performance degradation and is expressed in decibels (20 log Vh/Vc).

Table 2 shows the results of the acoustic noise tests as well as the retained austenite content, depth of indentation measured by the same method as previously described and surface hardness of each bearing. It is seen from the test results that the acoustic performance degradation lessens as the tempering temperature increases, and there is not any appreciable difference in this tendency between the steel A and steel B. However, a careful comparison between the test results of the steel A and steel B which contain different alloy compositions suggests that the bearings made of the steel A with a lower silicon content exhibit smaller amounts of acoustic performance degradation. A likely cause of this difference is that third stage tempering of the steel A begins at lower temperatures.

TABLE 2

| No. | Steel type | Composition (excluding residual austenite) | Tempering temperature | Tempering time (min.) | Retained austenite content (%) | Surface hardness(HRC) | Depth of indentation ($\mu$m) | Acoustic Peformance degradation (d$\beta$-a) |
| --- | --- | --- | --- | --- | --- | --- | --- | --- |
| 1 | A | Ferrite + cementite | 300° C. | 120 | —(*) | 57.5 | 0.010 | 5.0 |
| 2 | A | Ferrite + cementite | 320° C. | 120 | —(*) | 56.5 | 0 | 4.5 |
| 3 | A | Ferrite + cementite | 360° C. | 120 | —(*) | 54.0 | 0 | 0 |
| 4 | B | Ferrite + cementite | 350° C. | 120 | —(*) | 60.2 | 0 | 5.0 |
| 5 | B | Ferrite + cementite | 375° C. | 120 | —(*) | 58.2 | 0 | 1.5 |
| 6 | B | Ferrite + cementite | 400° C. | 120 | —(*) | 56.0 | 0 | 0.7 |
| 7 | A | Martensite + $\epsilon$-carbide + ferrite | 280° C. | 120 | 0 | 58.5 | 0.020 | 7.5 |
| 8 | B | Martensite + $\epsilon$-carbide + ferrite | 280° C. | 120 | 1 | 61.3 | 0.015 | 7.7 |
| 9 | A | Martensite + $\epsilon$-carbide + retained austenite | 180° C. | 120 | 12 | 62.7 | 0.072 | 12.5 |
| 10 | B | Martensite + $\epsilon$-carbide + retained austenite | 260° C. | 120 | 3 | 61.5 | 0.023 | 8.0 |

(*)No retained austenite exists in a mixed structure of ferrite and cementite.

and a plurality of rolling elements, were produced using both the steel A and steel B. The individual bearing elements were first hardened by using a quenching process in which they were heated to and kept at 850° C. for 30 minutes and rapidly cooled in an oil bath. Then, they were subjected to a 120-minute tempering process at temperatures between 150° C. and 500° C. as shown in Table 2, polished and assembled into small-sized ball bearings of bearing number 696.

The acoustic noise tests were conducted as follows. A pair of bearings to be tested were mounted on a shaft in such a way that a specific bearing pressure acts on the individual bearings, and acoustic noise levels were measured in terms of the speed of vibratory motion of each individual bearing in its axial direction. Measuring equipment used for vibration measurement incorporates in its rotary shaft a sensor for measuring vibrating speeds in the axial direction. This rotary shaft of the measuring equipment was lightly pressed against a side surface of the inner ring of each bearing when measuring its vibrating speed. Measurements were carried out over an audible frequency range of 300 to 6300 Hz with the maximum contact pressure between the individual rolling elements and the inner and outer rings set to 1.3 GPa and the revolving speed of the rotary shaft set to 2200 revolutions per minute.

The vibrating speed of each bearing was measured before and after a 120-hour-long storage at 90° C. using the It is apparent from the results of the indentation forming test shown in FIG. 4 that the depth of indentation which can be caused by prolonged exposure to high-temperature conditions becomes smaller when the tempering temperature is increased rather than when the retained austenite content of steel is simply reduced to 0% by second stage tempering. This indicates that a factor other than the retained austenite content affects the amount of acoustic performance degradation. It will be understood from the above discussion that stabilization of the microstructure of steel through high-temperature tempering greatly contributes to preventing the formation of indentations caused by contact stresses.

What is claimed is:

1. A rolling bearing comprising:
   an outer ring;
   an inner ring; and
   rolling members disposed between said outer and inner rings;
   wherein said outer and inner rings are made throughout of a high carbon steel material whose microstructure consists essentially of a mixture of ferrite and cementite, the microstructure being substantially free of martensite.

2. The rolling bearing according to claim 1, wherein the high carbon steel material comprises high-carbon chromium bearing steel.

3. A method of producing a rolling bearing having an inner ring made throughout of high carbon steel, an outer ring made throughout of high carbon steel and rolling members disposed between the inner and outer rings, said method comprising:

heating the high carbon steel inner and outer rings;

quenching the high carbon steel inner and outer rings; and tempering the high carbon steel inner and outer rings at a temperature higher than a third stage tempering temperature for the inner and outer rings to form a microstructure consisting essentially of a mixture of ferrite and cementite, the microstructure being substantially free of martensite.

4. A method of producing a rolling bearing having an inner ring made throughout of high-carbon chromium bearing steel, an outer ring made throughout of high-carbon chromium bearing steel and rolling members disposed between the inner and outer rings, said method comprising steps of:

heating the high carbon steel inner and outer rings;

quenching the inner and outer rings; and tempering the inner and outer rings at a temperature higher than a third stage tempering temperature for the inner and outer rings to form a microstructure consisting essentially of a mixture of ferrite and cementite, the microstructure being substantially free of martensite.

5. The method of producing a rolling bearing as defined in claims 3 or 4, further comprising increasing the surface hardness of the inner and outer rings to a Rockwell hardness number (HrC) of 56 or above after forming said microstructure consisting essentially of the mixture of ferrite and cementite.

* * * * *